US010610931B2

(12) United States Patent
Morton et al.

(10) Patent No.: US 10,610,931 B2
(45) Date of Patent: Apr. 7, 2020

(54) METHOD AND SYSTEM FOR PRODUCING FUNCTIONALLY GRADED STRUCTURES IN POWDER BED FUSION PROCESSING (71) Applicant: Board of Regents, The University of Texas System, Austin, TX (US)

(72) Inventors: Philip A. Morton, El Paso, TX (US); Ryan Wicker, El Paso, TX (US); Jorge Mireles, El Paso, TX (US); Alejandro Hinojos, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 361 days.

(21) Appl. No.: 15/434,683

(22) Filed: Feb. 16, 2017

(65) Prior Publication Data

US 2017/0232517 A1    Aug. 17, 2017

Related U.S. Application Data (60) Provisional application No. 62/459,657, filed on Feb. 16, 2017, provisional application No. 62/295,620, filed on Feb. 16, 2016.

(51) Int. Cl.
| | | |
|---|---|---|
| *B22F 3/105* | (2006.01) | |
| *B22F 3/00* | (2006.01) | |
| *B33Y 10/00* | (2015.01) | |
| *G06F 17/50* | (2006.01) | |
| *B33Y 50/00* | (2015.01) | |

(52) U.S. Cl.
CPC ............ *B22F 3/1055* (2013.01); *B22F 3/008* (2013.01); *B33Y 10/00* (2014.12); *B33Y 50/00* (2014.12); *G06F 17/5018* (2013.01); *G06F 17/5086* (2013.01); *B22F 2998/10* (2013.01); *B22F 2999/00* (2013.01); *Y02P 10/295* (2015.11)

(58) Field of Classification Search
CPC .... B22F 3/1055; B22F 3/008; B22F 2998/10; B22F 2999/00; G06F 17/5018; G06F 17/5086; B33Y 50/00; B33Y 10/00; Y02P 10/295

See application file for complete search history.

(56) References Cited

U.S. PATENT DOCUMENTS 5,156,697 A    10/1992    Bourell et al.
5,182,170 A     1/1993    Marcus et al.
(Continued)

FOREIGN PATENT DOCUMENTS

WO    WO-2014074947 A2 *  5/2014  ............ B22F 3/1055

OTHER PUBLICATIONS

Davis, J.R.. (1998). Metals Handbook, Desk Edition (2nd Edition)—A. (pp. 52). ASM International. (Year: 1998).*
(Continued)

*Primary Examiner* — Jessee R Roe
*Assistant Examiner* — Rebecca Janssen
(74) *Attorney, Agent, or Firm* — Yee & Associates, P.C.

(57) ABSTRACT

Methods and systems comprise new design procedures that can be implemented for additive manufacturing technologies that involve evaluation of stress concentration sites using finite element analysis and implementation of scanning strategies during fabrication that improve performance by spatially adjusting thermal energy at potential failure sites or high stress regions of a part.

20 Claims, 8 Drawing Sheets (56) References Cited

U.S. PATENT DOCUMENTS

| | | | |
|---|---|---|---|
| 5,286,441 A * | 2/1994 | Shibata | C22C 1/1036 |
| | | | 419/21 |
| 5,352,405 A | 10/1994 | Beaman et al. | |
| 5,817,206 A | 10/1998 | McAlea et al. | |
| 6,617,546 B2 | 9/2003 | Manetsberger et al. | |
| 7,705,264 B2 | 4/2010 | Hoebel et al. | |
| 8,828,116 B2 | 9/2014 | Fuwa | |
| 2003/0010409 A1 * | 1/2003 | Kunze | B22F 3/1055 |
| | | | 148/513 |
| 2014/0154088 A1 | 6/2014 | Etter et al. | |

OTHER PUBLICATIONS

ASTM ISO/ASTM52900-15 Standard Terminology for Additive Manufacturing—General Principles—Terminology, ASTM International, West Conshohocken, PA, 2015 (Year: 2015).*

* cited by examiner

METHOD AND SYSTEM FOR PRODUCING FUNCTIONALLY GRADED STRUCTURES IN POWDER BED FUSION PROCESSING

CROSS REFERENCE TO RELATED PATENT APPLICATIONS

This patent application claims the priority and benefit under 35 U.S.C. § 119(e) of U.S. Provisional Patent Application Ser. No. 62/295,620, filed Feb. 16, 2016, entitled "METHOD AND SYSTEM FOR PRODUCING FUNCTIONALLY GRADED STRUCTURES IN POWDER BED FUSION PROCESSING." U.S. Provisional Patent Application Ser. No. 62/295,620 is herein incorporated by reference in its entirety.

This patent application also claims the priority and benefit under 35 U.S.C. § 119(e) of U.S. Provisional Patent Application Ser. No. 62/459,657, filed Feb. 16, 2017, entitled "METHOD AND SYSTEM FOR PRODUCING FUNCTIONALLY GRADED STRUCTURES IN POWDER. BED FUSION PROCESSING." U.S. Provisional Patent Application Ser. No. 62/459,657 is herein incorporated by reference in its entirety.

TECHNICAL FIELD

Embodiments are generally related to 3D printing technology. Embodiments are additionally related to methods and systems for controlling microstructural aspects of parts produced through powder bed fusion, directed energy deposition, and binder jetting additive manufacturing technology. Controlling the frequency, size, volume fraction, and density of precipitates, porosity, grain size, and phase volume fraction enables the spatial control and design of a material's microstructure. Improving mechanical performance, controlling failure, increasing operating temperature, or designing dielectric properties are a few potential applications possible when controlling the aforementioned microstructural aspects.

Embodiments of thermally intensive processes (i.e., powder bed fusion and directed energy deposition) are related to the processing environment wherein precursor powder is melted. A system pairing fundamental material science, thermodynamics, and kinetics with the control and freedom of 3D printing technology allows the reprocessing of areas ranging in size from microns to meters. Thus, reprocessing an area in an altered environment will produce an altered microstructure within said area.

Embodiments pertaining to creation of tailored composite structures are achieved via binder jetting 3D printing technology. Binder jetting 3D printing technology is comprised of systems and/or methods to create gradient or graded composite structures. A porous structure is created with binder jetting technology, sintered (or heat treated) in a gaseous environment, and is infiltrated with another material in liquid form. This results in a composite wherein composition is controlled by intentional porosity.

BACKGROUND

Metal powder bed fusion additive manufacturing (AM) technologies have allowed for the fabrication of complex geometries without the need of tooling, molds, or dies while also limiting material waste. Electron beam melting (EBM), for example, uses a metal powder precursor material that is selectively melted in a layer-by-layer fashion using an electron beam, referred to as powder bed fusion.

AM technologies like EBM have seen increased use in aerospace, biomedical, and automotive industries to manufacture re-engineered components with improved performance as a result of added complexity and functionality. A common result from metallurgical studies shows microstructural anisotropy in the Z-direction (i.e., direction perpendicular to the build, platform) of fabricated parts.

Accordingly, it is believed that a need exists for methods and systems that improve the fatigue performance of EBM-fabricated parts.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide enhanced additive manufacturing techniques.

It is another aspect of the disclosed embodiments to provide methods and systems for electron beam melting fabrication.

It is another aspect of the disclosed embodiments to provide a method and system for controlling microstructural architecture of EBM-fabricated parts.

It is another aspect of the disclosed embodiments to provide methods and systems for improved fatigue performance of EBM-fabricated parts.

It is another aspect of the disclosed embodiments to provide methods and systems for manufacturing parts with carbide rich regions.

In the embodiments disclosed herein, one or more scans can be applied to a part in order to promote grain coarsening via added thermal energy. The additional energy causes coarsening of microstructures that, in turn, improves mechanical properties of as-fabricated parts as well as surface characteristics (e.g., reduced porosity). Results show a 22% fatigue life improvement from L-brackets with as-fabricated conditions to L-brackets with a graded microstructure resulting from the selective addition of thermal energy as disclosed herein in the expected failure region.

The embodiments also provide methods and systems for controlling spatia microstructural gradients through the electron beam melting additive manufacturing (EBMAM) process by means of controlling thermal energy input. The microstructural variations achieved can be used to spatially control mechanical properties to selectively strengthen or weaken desired locations within an AM fabricated part. Spatial property tailoring can be used in damage tolerance design and allow for controlled failure of aerospace components.

In addition, embodiments can comprise new design procedures that can be implemented for additive manufacturing technologies that involve evaluation of stress concentration sites using finite element analysis and implementation of scanning strategies during fabrication that help improve performance by spatially adjusting thermal energy at potential failure sites or high stress regions.

The aforementioned aspects and other objectives and advantages can now be achieved as described herein. In one embodiment, a method comprises designing a part, evaluating material performance in the part, developing a treatment cycle, and implementing the treatment cycle during an additive manufacturing of the part in order to improve performance of the part.

In an embodiment, a method for manufacturing parts with precipitate rich regions comprises establishing an inert environment in a build chamber of a 3D printing machine, melting powder in the build chamber to form a layer of the part, reducing a process temperature, altering gas pressure, re-melting a specified region, and repeating each of the steps for each layer of the part until the part is completed. The method can further comprise initializing the machine to create precipitate rich regions in the part.

In another embodiment, a method for manufacturing composite parts with graded compositions comprises creating CAD models of at least one part containing porosity, setting up a manufacturing machine, removing powder within at least one intended porous regions, curing, sintering, and/or heat treating the part, preparing secondary material in liquid form, infiltrating a 3D object with liquid material, and post-processing the part. The manufacturing comprises binder jetting additive manufacturing.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples, can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
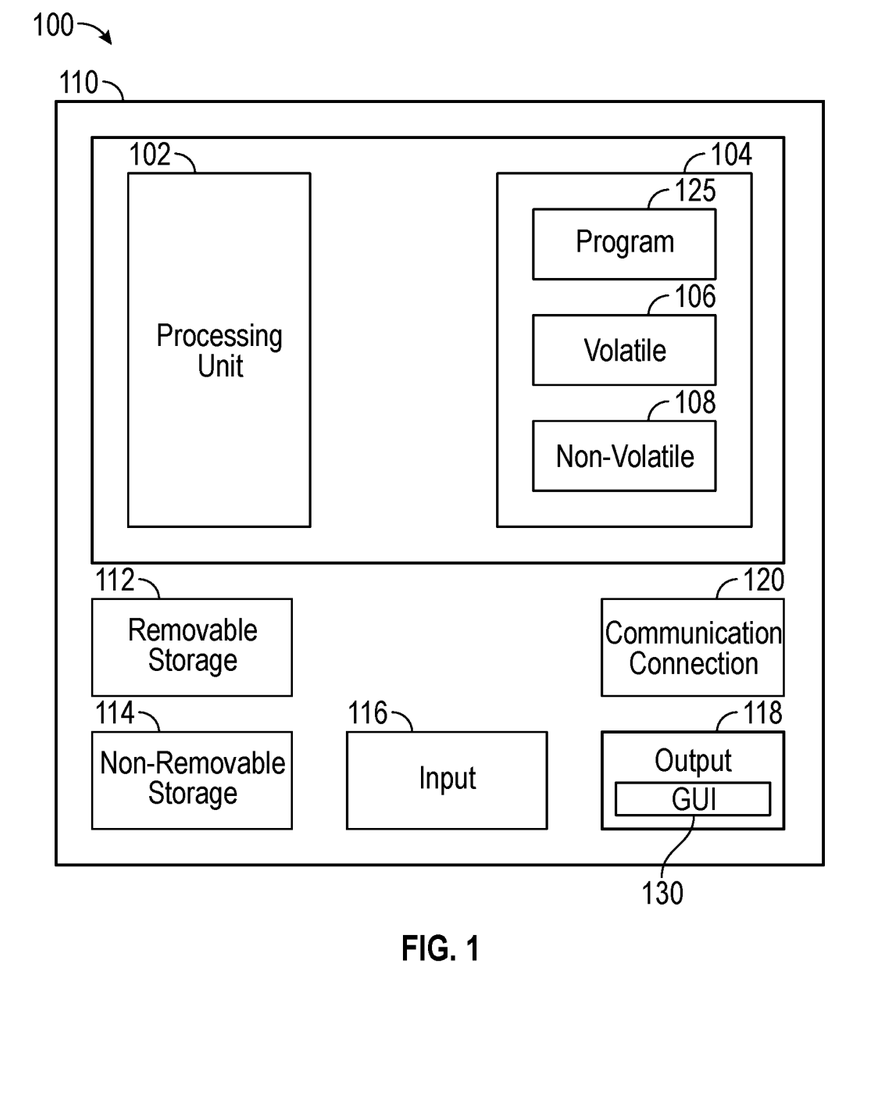
FIG. 1 illustrates a block diagram of a computer system which is implemented in accordance with the disclosed embodiments.
Figure 2:
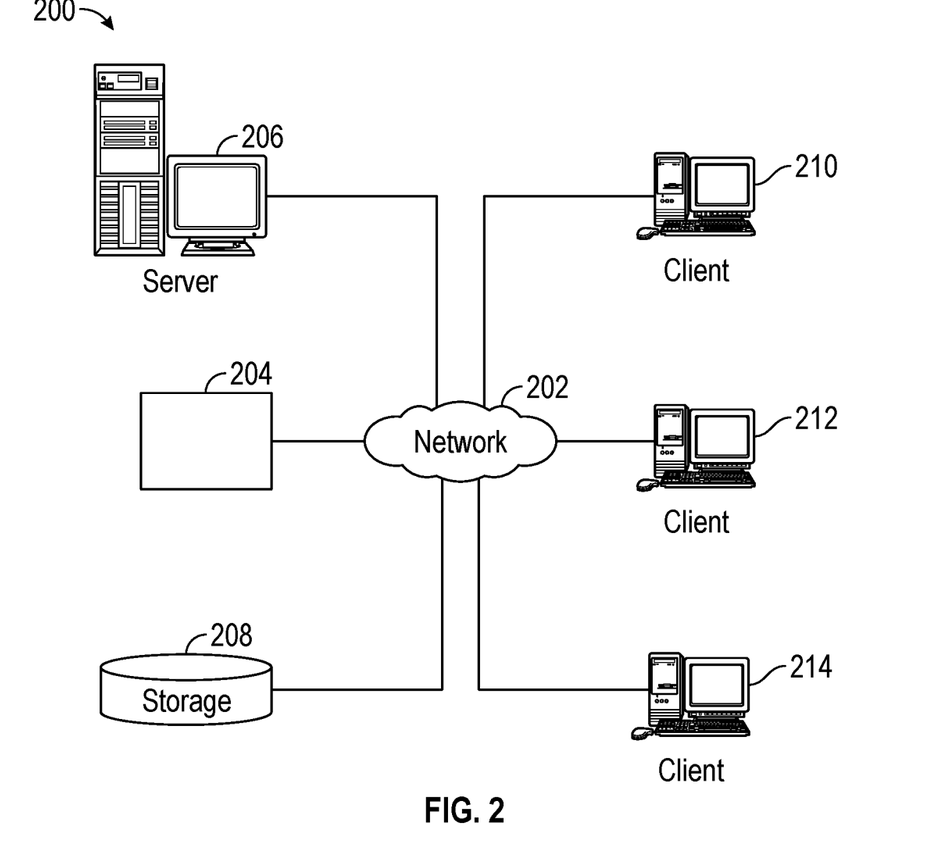
FIG. 2 illustrates a graphical representation of a network of data-processing devices in which aspects of the present invention may be implemented.
Figure 3:
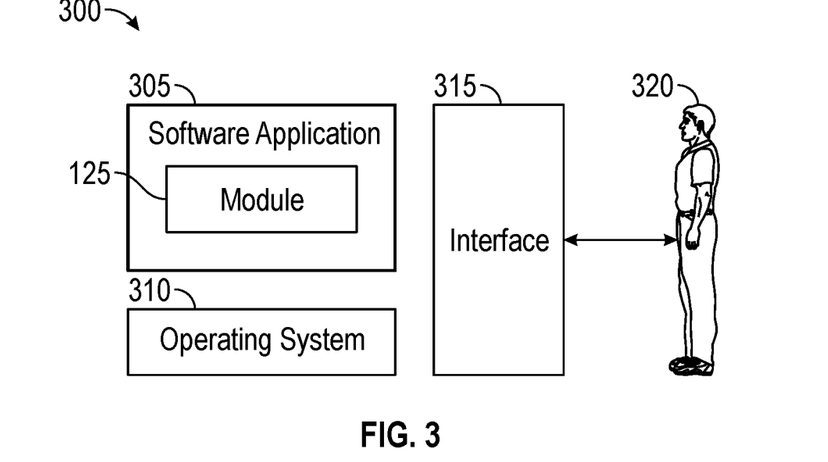
FIG. 3 illustrates a computer software system for directing the operation of the data-processing system depicted in FIG. 1, in accordance with an embodiment of the invention.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 118, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs files, options, and so forth by means of graphically displayed icons, menus, and dialog boxes on a computer monitor screen. A user can interact with the GUI to select and activate such options by directly touching the screen and/or pointing and clicking with a user input device 118 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices 204, which may be embodied as a sensor, a manufacturing device, a 3D printer, an additive manufacturing device, a powder bed fusion device, a binder jetting device, a directed energy deposition device, a laser, or other such device, and a memory storage unit such as, for example, memory or database 208.

In the depicted example, external device 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, printing device, 3D printer, medical sensor, etc.

Computer system 100 can also be implemented as a server such as server 206, depending upon design considerations. In the depicted example, server 206 provides data such as boot files, operating system images, applications, and application updates to clients 210, 212, and 214, and/or to external device 204. Clients 210, 212, and 214 and sensor 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112 or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist ire the performance of a specific task such as word processing, accounting, inventory management etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, CAD, and the like. Therefore, the descriptions of the exemplary embodiments, which follow, are for purposes of illustration and not considered a limitation.

Terminology referencing 3D printing, as used herein, is defined by the ASTM F42 committee. 3D printing refers to a group of technologies defined by the following synonyms: additive manufacturing, rapid prototyping, additive layer manufacturing, layer manufacturing, or others defined by ASTM F42. Technology names (i.e., powder bed fusion, directed energy deposition, binder jetting, electron beam melting, etc.) refer to terms defined by the ASTM F42 committee.

Electron beam melting is a sub category of powder fusion 3D printing technology. Similar methods can be used with other laser based powder bed fusion 3D printing machines to achieve improved performance. Other types of 3D printing technology such as directed energy deposition and binder jetting can be used to manufacture materials with improved properties using methods described herein. Additionally, conventional methods of manufacturing, welding, casting, and forging can yield improved material characteristics by implementing methods and systems herein.

Additive manufacturing (AM) technologies like EBS have seen increased use in aerospace, biomedical, and automotive industries to manufacture re-engineered components with improved performance as a result of added complexity and functionality. Microstructural anisotropy in the Z-direction (i.e., direction perpendicular to the build platform) of fabricated parts can be controlled by increasing thermal energy during fabrication and prolonged exposure of early layers to an elevated temperature environment as compared, to the final layers. Although part anisotropy is a potential drawback for design engineers, microstructural anisotropy allows processing strategies to be modified to control the amount of thermal energy provided during fabrication to further allow spatial control of microstructural architectures in EBM-fabricated parts as described in the methods and systems disclosed herein.

Figure 4:
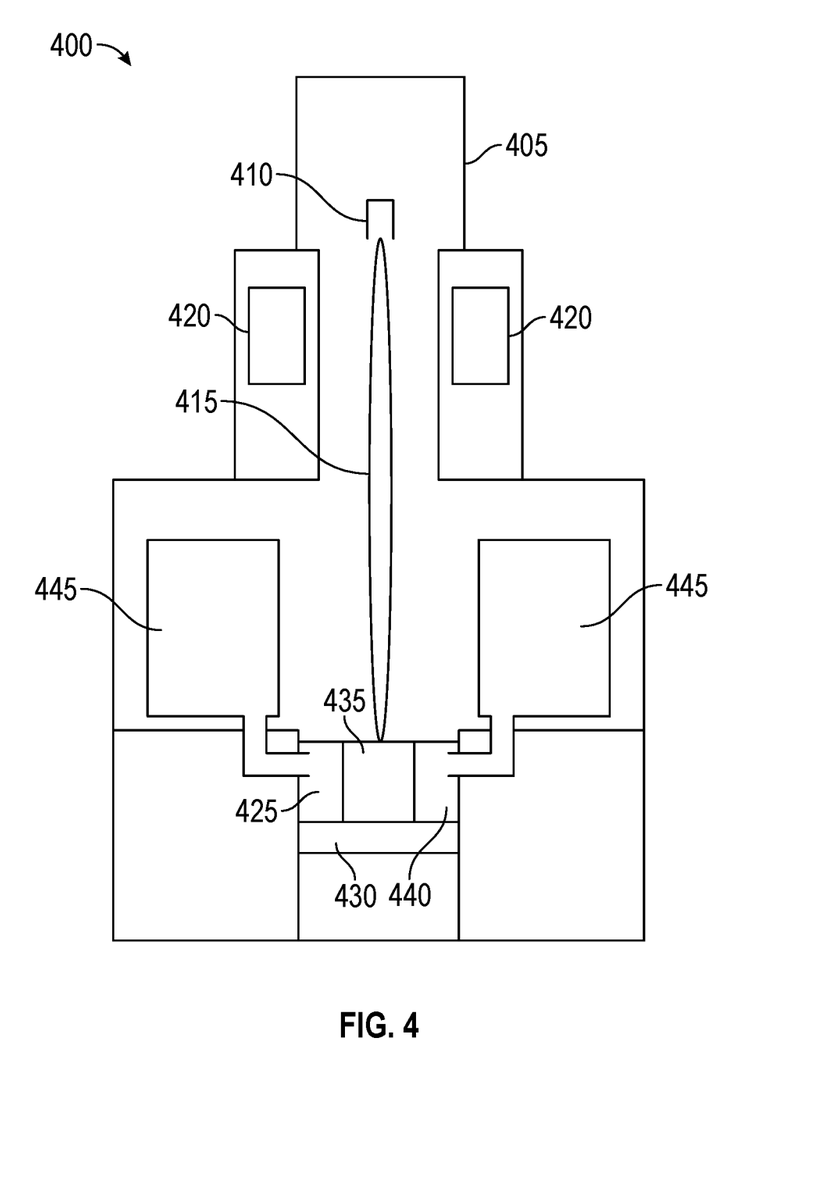
FIG. 4 illustrates a block diagram of a 3D printing apparatus in accordance with the disclosed embodiments.

FIG. 4 illustrates an exemplary EBM printing system 400 in accordance with the embodiments disclosed herein. It should be appreciated that other printing system may alternatively be employed in various embodiments, and that the present EBM system 400 is meant to illustrate one such embodiment. Such other printing systems include, but are not limited to, additive manufacturing technologies, powder bed fusion devices, binder jetting devices, and directed energy deposition devices. Generally EBM printing systems, such as EBM printing system 400, include an electron beam column 405 that houses a filament 410. The filament generates an electron beam 415. The electron beam 415 can be adjusted and manipulated in various ways with an arrangement of lenses 420 as it passes through the beam column 405 to the build chamber 425. The build chamber 425 includes an adjustable build platform 430 on which the part 435 sits. Powder 440, (generally comprising metallic powder), is fed into the build chamber 425 from powder tank 445.

The EBM printing system 400 can selectively melt the metallic powder 440 layer-by-layer using the electron beam 415. In some embodiments, the beam 415 can be a 1.5 kW electron beam, but other powers can also be used. The process takes place in a build chamber, such as chamber 425, which is preferably a vacuum chamber (preferably below 10-3 torr) with metallic powder bed 440 kept at a given temperature (approximately 760° C. for Ti-6Al-4V) throughout fabrication. Thermal energy input can be selectively and specifically modified throughout fabrication allowing 3D spatial control of the resulting microstructure of part 435. Methods can be used to evaluate the desired part. The part may include simple or complex geometry with one or more known failure sites.

In an embodiment, the methods and systems disclosed herein use heat sources to change the thermal behavior of a part. In many cases, controlling the thermal exposure of a part, in particular an EBM fabricated part, can result in a more robust end product. The product can be stronger, can have reduced porosity, and the process can change the patterns of the material microstructure.

Figure 5:
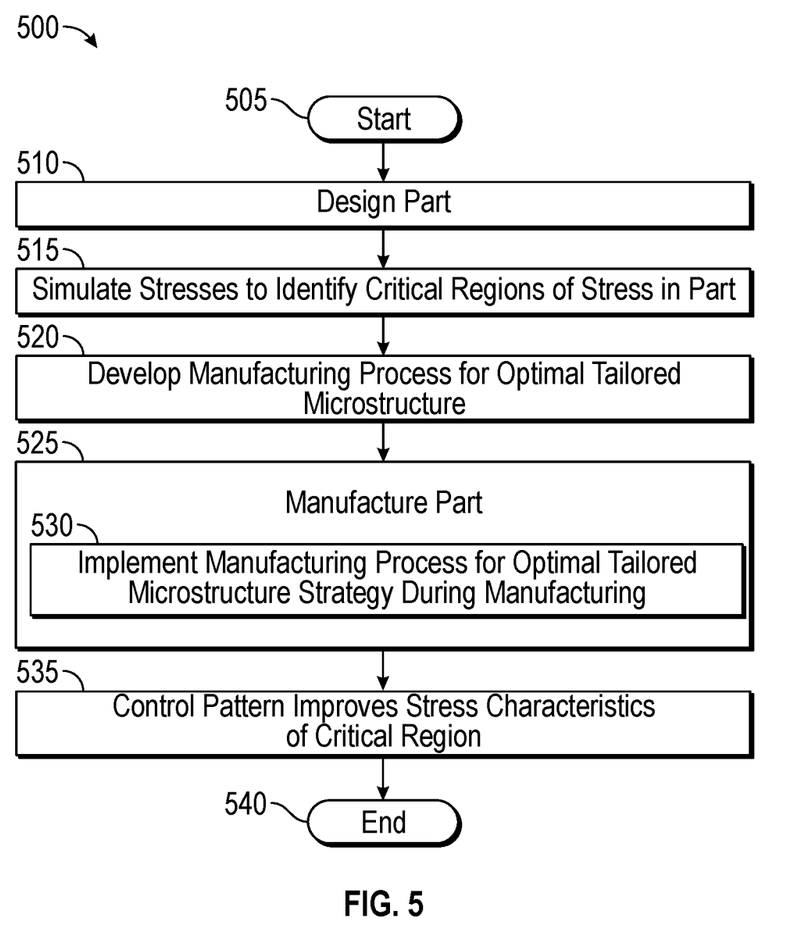
FIG. 5 illustrates a flow chart of steps associated with a method of manufacturing a part, in accordance with an embodiment.

FIG. 5 provides a high level flow chart describing steps associated with a method 500 for manufacturing parts in accordance with the disclosed embodiments. The method 500 starts at step 505. In some embodiments, a part can be designed as illustrated at step 510. In exemplary embodiments, the part design step can be achieved electronically, for example, using computer aided drafting software. Next, at step 515, simulations can be used to evaluate the stress behavior of the part. For example, finite element analysis may be used. The results can indicate critical regions of stress in the part according to the part geometry and intended deployment of the part.

With an understanding of the critical stress regions of the part, an optimal manufacturing process can be developed to tailor the microstructure of the part in a way that addresses the critical stress regions as illustrated at step 520. A separate treatment strategy can then be applied to the region in order to improve the stress characteristics of the region, and by extension, the part as a whole. The treatment strategy can depend on stress behavior identified for the part. For example, in some cases the desired result may be to reduce porosity, in others the goal may be to change the microstructure of the part at the critical region of stress. In other embodiments, the goal may be to form carbides in the critical region of stress. Various patterns of thermal control during fabrication can be used to achieve the desired outcome at the critical region.

For example, in some cases microstructural morphology affects low cycle (less than 103 cycles) and high cycle (more than 103 cycles) fatigue differently where lamellar grains have superior fatigue performance for high cycles while bimodal or equiaxed microstructures are better in low cycle. In addition, microstructural gradients can improve the performance of lamellar and equiaxed microstructures. Using thermal control methods, microstructures can be tailored to optimally perform in both high and low cycle fatigue by creating microstructural gradients in predicted areas of crack initiation and crack propagations.

More generally, the treatment strategy can apply thermal energy input selectively and specifically modified throughout fabrication allowing 3D spatial control of the resulting microstructure. The embodiments herein describe the creation of variations in EBM microstructural architectures as a means to improve the fatigue performance of EBM-fabricated parts.

Once a treatment strategy has been developed, the part can be manufactured as shown at step 525. As illustrated, the manufacturing process can include an implementation of the optimal manufacturing process developed to tailor the microstructure as illustrated at step 530. The implemented manufacturing process, and in particular the control pattern associated with the manufacturing process, improves the stress characteristics of the critical region of the finished part, as shown at step 535.

Additional features may include improved surface finish to improve fatigue performance and optimized microstructure/phase volume fraction. Optimized microstructure phase volume fraction can include enhanced cell growth in localized regions, increased ductility in small/thin parts, and increased surface hardness. Other features include reduced porosity in critical performance regions, control of crack propagation rates, designated crack propagation paths, optimization of wear performance, and graded material chemistry through vaporization of alloying elements.

The method ends at step 540. The embodiments disclosed herein thus use variations in EBM microstructural architectures as a means to improve the fatigue performance of EBM-fabricated parts.

Figure 6:
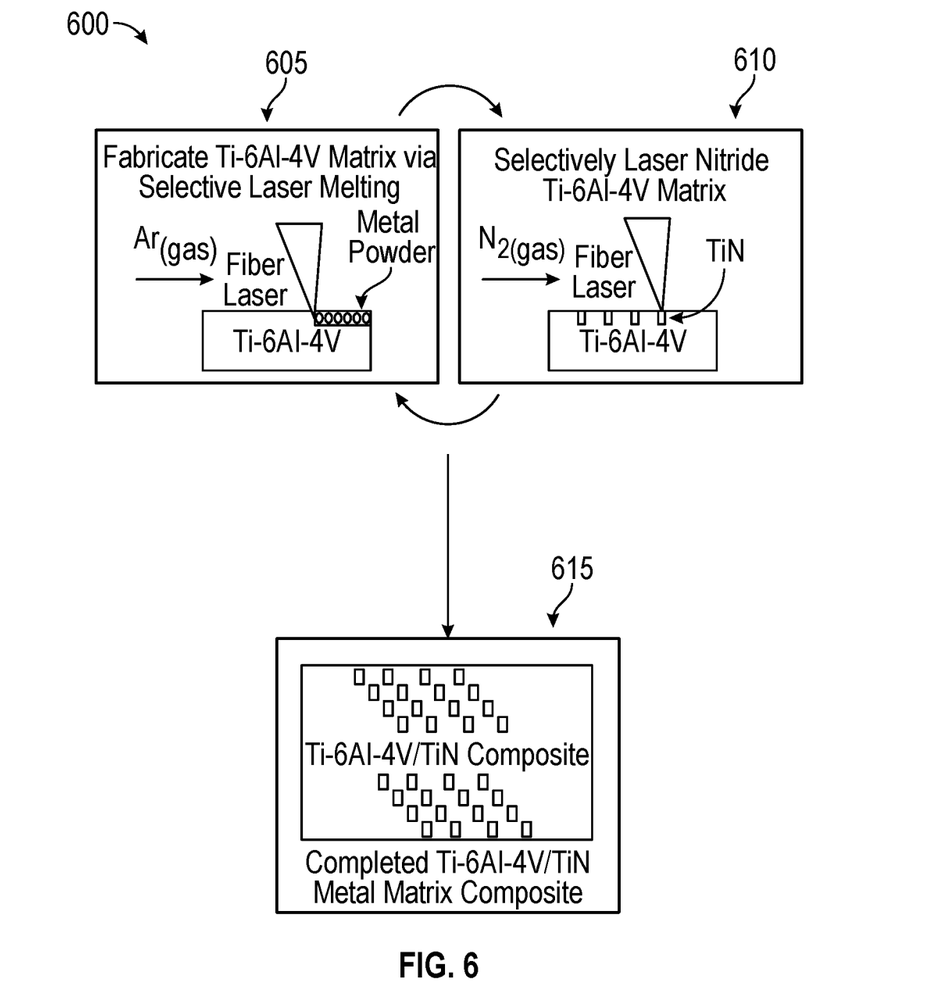
FIG. 6 illustrates a block diagram of steps associated with a method of tailoring the structure of a part, in accordance with an embodiment.

FIG. 6 illustrates a more specific embodiment of a method 600 for producing functionally graded structures in powder bed fusion processing. As illustrated at step 605, a Ti-6Al-4V Matrix can be fabricated in association with a given part. During this step, the metal powder can be selectively melted and can be maintained in an Ar gas bath. At step 610, the chamber can be filled with $N_2$ and the laser can selectively be applied to the Nitride Ti-6Al-4V matrix as shown. Step 605 and step 610 can be repeated until a completed Ti-6Al-4V/TiN metal matrix composite is created, as shown at step 615.

Figure 7:
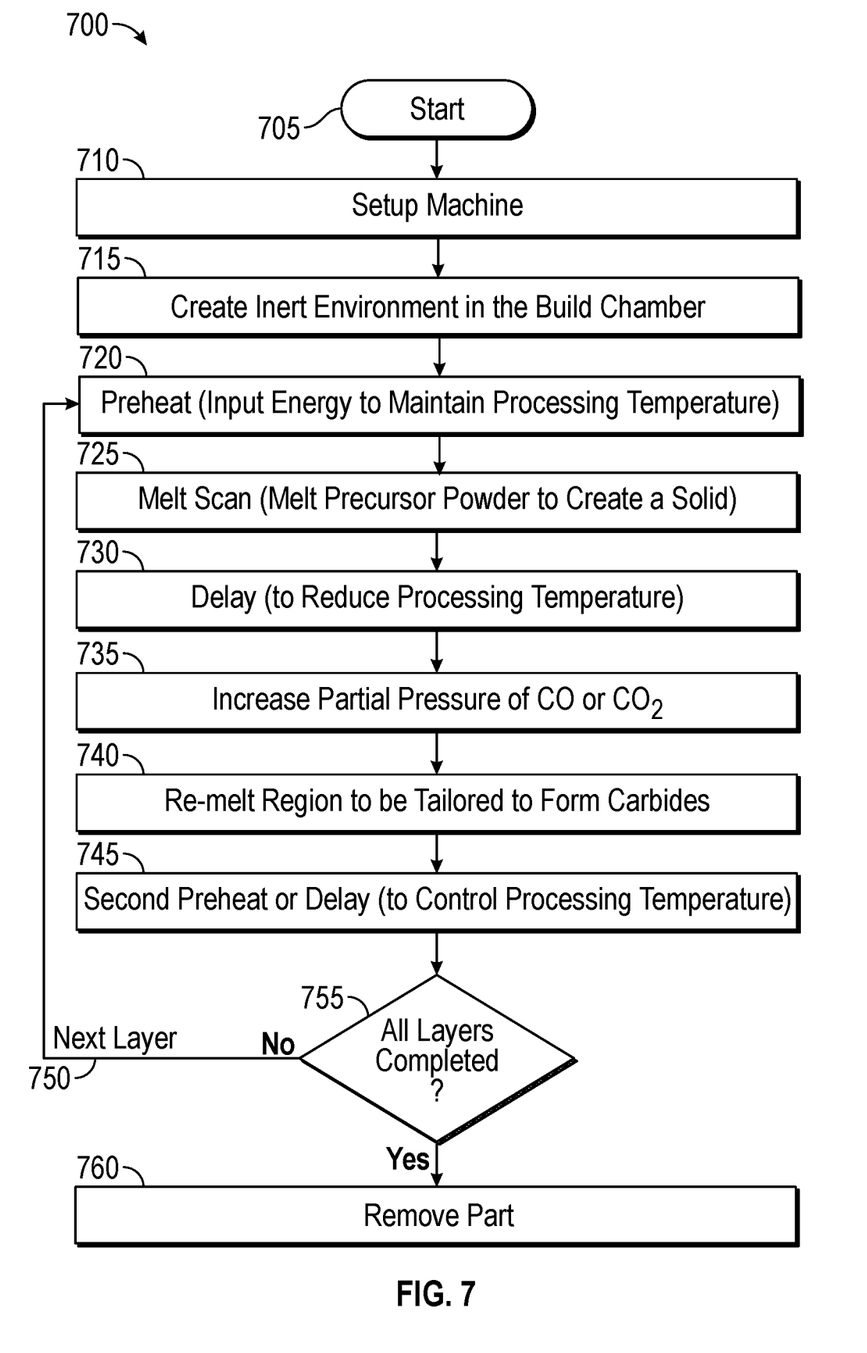
FIG. 7 illustrates a flow chart of steps associated with a method of tailoring the microstructure of a part, in accordance with an embodiment.

FIG. 7 illustrates steps in a method 700 for improved manufacturing to create carbide rich regions. The method 700 starts at block 705. At block 710, a machine can first be setup. It should be appreciated that in an embodiment, the machine can be an Arcam 512 system (Arcam EBM 512, Arcam AB, Mölndal, Sweden) using Ti-6Al-4V Grade 5 alloy powder or other similar system. In other embodiments, other machines can be used.

An inert environment is next created in the build chamber of the machine as shown at block 715. A preheating step is implemented at block 720. This can involve inputting energy into the build chamber (e.g., with a heater, electron beam, etc.) to maintain the desired processing temperature. The melt scan is then initiated at block 725. The melt scan melts the precursor powder to create a solid form. A delay is then required at block 730 to reduce the processing temperature. It should be understood that the delay time can be determined according to the developed manufacturing process for optimal tailored microstructures described herein.

Following the delay at block 730, an increase of the partial pressure of the CO or $CO_2$ is required as illustrated by block 735. The region which requires tailoring according to the identification of critical areas is re-melted as shown by block 740 in order to form carbides. The re-melting may be at a prescribed temperature and for a prescribed time depending on the desired characteristics of the tailored region.

A second preheat or delay as shown at block 745 may be included at this point in order to control the processing temperature. At this stage, the process for the layer is complete. The process may then be iterated as shown by arrow 750 for additional layers of the part being manufactured. It is notable that the steps may be included for some or all layers of the part. In certain cases, it may be desirable to include the melting steps required to create carbides in some but not all layers, depending on design considerations.

When all of the layers have been completed as illustrated at block 755, the part is finished and can be removed as shown at block 760 from the 3D printing machine, at which point the method ends.

Figure 8:
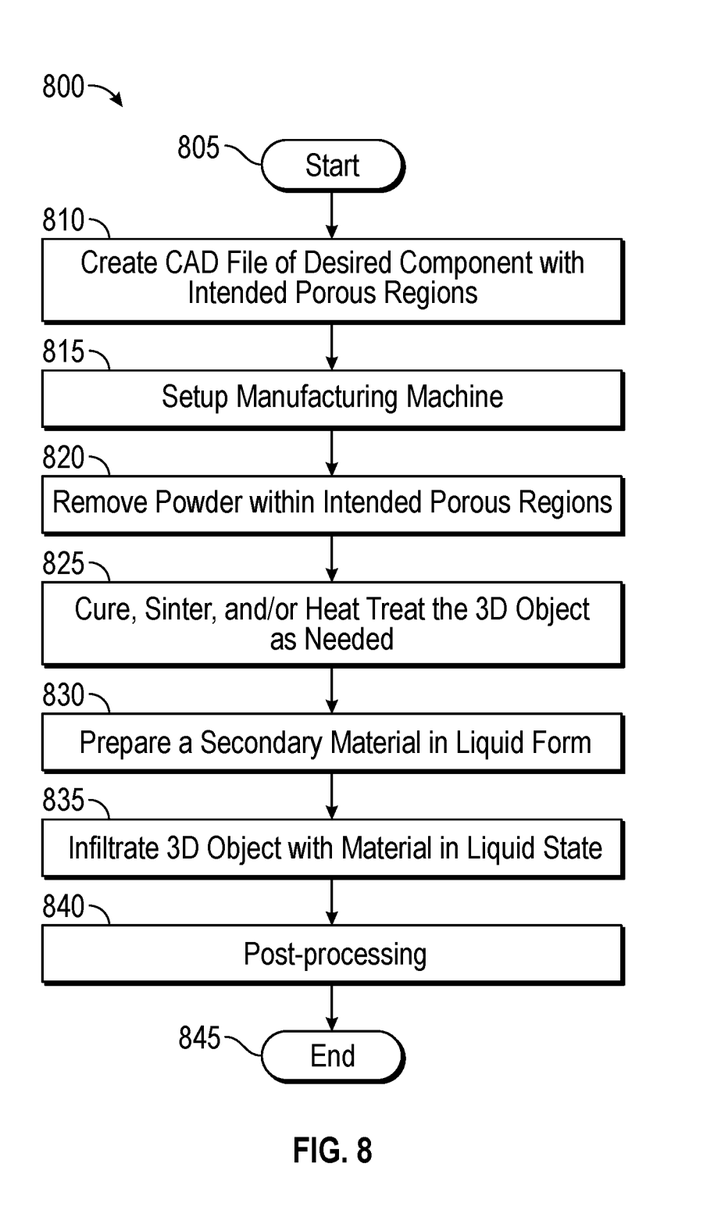
FIG. 8 illustrates a flow chart of steps associated with a method to create carbide rich regions in a part, in accordance with an embodiment

FIG. 8 illustrates another embodiment of a method 800 for part manufacturing. After the method 800 starts at block 805, a CAD, file of the desired component with intended porous regions can be created as shown at block 810. The manufacturing machine (e.g., art EBM machine) can be set up at, block 815. The powder within the intended porous regions of the part can be removed at block 820. Once the part has been manufactured, the remaining 3D object can be cured, sintered, and/or heat treated as needed as illustrated at block 825. A secondary material is next prepared in liquid form as shown at block 830. Infiltration of the 3D object with material in a liquid state is completed at block 835. Finally, post-processing of the part can be completed as necessary as shown at block 840. The method ends at block 845.

Figure 9:
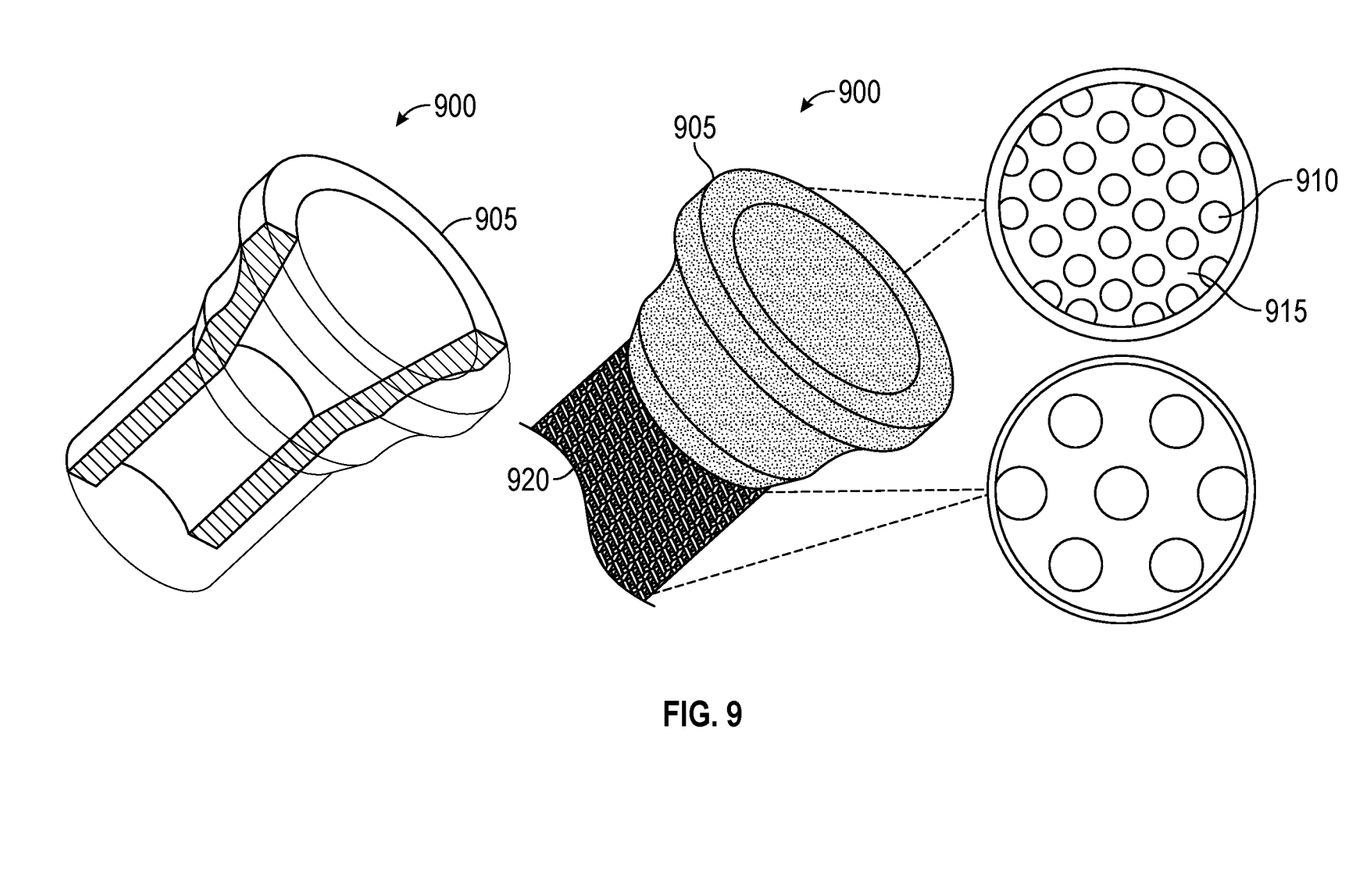
FIG. 9 illustrates an exemplary part manufactured with tailored composites, in accordance with an embodiment.

FIG. 9 illustrates exemplary tailored composites of a nozzle 900. The nozzle 900 illustrates the tailored porosity desired and can be manufactured according to the steps illustrated in method 800. The nozzle head 905 includes a ceramic material 910 for temperature resistance with metal material 915 for structural support. The nozzle neck 920 is a composite structure formed via infiltration.

Experimental Support

In a specific example, a simple L-bracket was chosen for testing to compare the as-fabricated microstructure to parts manufactured according to the methods and systems disclosed herein. The parts were machined from wrought Ti-6Al-4V. Low cycle fatigue was used to evaluate performance of the obtained microstructural architectures in the L bracket specimens. In accordance with the disclosed embodiments, a graded microstructure was achieved by selectively adding thermal energy for in situ heat treating to allow grain growth to occur and tailor microstructural morphology to become comparable to wrought microstructure (i.e., equiaxed microstructure). Microstructural gradients created according to the embodiments disclosed herein improved the performance of the lamellar and equiaxed microstructure. According to the embodiments disclosed herein, thermal control methods are implemented, microstructure scans are tailored to optimally perform in both high and low cycle fatigue by creating microstructural gradients in predicted areas of crack initiation and crack propagations.

Each leg of the tested part is 50 mm in length containing 10 mm diameter holes with the center located 10 mm from the three nearest edges, and 10 mm in width. A 2.5 mm fillet at the inner corner of the bracket was identified as the designated failure region. The part was manufactured using an Arcam S12 system (Arcam EBM S12, Arcam AB, Möldal, Sweden) using Ti-6Al-4V Grade 5 alloy powder Note, in the embodiments disclosed herein, other similar systems might alternatively be used. A commercial Ti-6Al-4V powder was used in this example with a bi-modal particle distribution between 45 and 100 microns (mean~60 micron).

In total, five bracket types were manufactured for testing, separately in different builds (as shown in Table 1), which included: 1) three wrought machined brackets, 2) three horizontally oriented EBM-fabricated brackets (with hole's concentric axis perpendicular to the build platform), 3) three vertically oriented EBM-fabricated brackets (with hole's concentric axis parallel to the build platform), 4) three horizontal brackets with graded microstructures (second melt in a specific region), and 5) three horizontal brackets with added thermal energy (3 melts cycles) throughout the entirety of fabrication. In accordance with the embodiments, additional melt scans can be incorporated to add thermal energy as a means to facilitate grain growth. It should be noted that each bracket was fabricated separately in groups consisting of the different aforementioned bracket types.

Fatigue testing was performed for all brackets using an MTS Landmark Servohydraulic test system. Testing conditions were designed to maintain the known failure point for all brackets and performed using a constant load condition of 16 kN axial cyclic loading at a frequency of 0.7 Hz and testing three specimens of each fabrication method. The loading conditions were selected to achieve failure within a 4-8 hour time period based on analytical fatigue calculations. Fractography was performed by observing fracture surfaces in a Hitachi S4800 field-emission scanning electron microscope.

The brackets were fabricated and fatigue tested. The graded region (where additional thermal energy was applied according to the embodiments disclosed herein) was visible upon macro observation. Warping in the graded region was notable upon macro observation due to the added energy applied to the material. Thus a part fabricated using multiple melt cycles may require CNC-milling to meet dimensional specifications in accordance with an embodiment.

According to the embodiments of the invention, additional heat energy applied through additional melt cycles facilitates grain growth by increasing grain boundary energy thus increasing grain boundary velocity. Collecting the part's thermal history can aid in prediction of thermal distortion caused by thermal gradients and microstructural morphology.

Large amounts of alpha phase exist in EBM-fabricated parts with prolonged exposures to the electron beam. Microstructural differences are acicular α-phase in the horizontal EBM-fabricated part, acicular thick lamellar α-phase structure in the parts with graded microstructure, and parts containing multiple melts with a respective 50% and 142% increase of alpha grain thickness. Alpha grain thicknesses were measured to be 1.3 μm, 2.5 μm, and 4 μm for the horizontally oriented part, the region with increased thermal energy from the part, and the part exposed to multiple beam scanning, respectively. Grain size is related to yield strength according to the Hall-Petch relationship, where larger grains of EBM as-fabricated parts result in improved tensile properties.

Fatigue Testing

Fatigue testing results presented in Table 1 below show the machined wrought Ti-6Al-4V had the best fatigue life compared to as-fabricated brackets (horizontally and vertically oriented) and brackets with graded microstructure. It is noteworthy to see that the fatigue life did not change appreciably between the horizontally and vertically oriented parts. Improvement of fatigue performance for the graded L-brackets when compared to the as-fabricated brackets can be attributed to the microstructure morphology and change of grain size from the added thermal energy at the failure region, in accordance with the disclosed embodiments.

As shown by Table 1, the parts exposed to three melt scans and CNC-milling had a comparable fatigue performance compared to the wrought machined L-brackets due to machined surface finish and characteristic microstructure. Nonetheless, according to the embodiments herein, tailored microstructures using EBM can be achieved. Scanning strategies may also be employed to avoid warping of parts due to the added thermal energy.

TABLE 1

Fatigue results of different bracket types tested

| Fabrication Method | Average number of cycles |
| --- | --- |
| Wrought Machined | 17,200 ± 1,020 |
| Horizontally Oriented* | 5,220 ± 40 |
| Vertical Oriented | 5,549 ± 120 |
| Graded Microstructure* | 6,790 ± 920 |
| Multiple Scanning* | 17,100 ± 960 |

*horizontally oriented

After fatigue testing, the fracture surfaces were studied to determine crack propagation rates for wrought and EBM-fabricated L-brackets. The results show the fracture surface of the machined wrought L-brackets corresponded closely to the fracture surface of the bracket with three melt cycles. Crack propagation rates for the wrought bracket were found to be the largest with an average of 2.74 μm/cycle, while propagation rates for the brackets with graded microstructure and as-fabricated microstructure were measured to be ~1.6 μm/cycle. Changes of crack initiation times and crack propagation rates were changed due to microstructural modifications. The equiaxed structure of the wrought bracket had the smallest stage 2, but was resistant to crack initiation due to microstructure and surface finish showing the best fatigue performance. The horizontal EBM-fabricated bracket had the smallest crack propagation rate, but worst fatigue performance.

The methods and systems disclosed herein provide beam scanning strategies developed to tailor microstructure as a means to improve fatigue performance of EBM-fabricated parts. Selectively controlling the strength of a material during EBM fabrication allows the spatial design of mechanical performance. Specifically, in as-fabricated conditions a graded microstructure showed a 22% fatigue life improvement compared to the original horizontal EBM bracket.

In certain embodiments, implementation of the scanning strategies can include addition of thermal energy. This results in thickened alpha grains by up to 142% and increased alpha phase dominance by up to 15% from the standard processing conditions. Changes to scan strategies with added machining can also be implemented in accordance with the disclosed embodiments to improve fatigue life compared to the standard processing conditions with as-fabricated microstructure/surface finish.

Certain characteristics such as surface finish, defect structure, or microstructure may affect fatigue life improvement in products fabricated using multiple melt scans as described herein. The enlarged grains are a result of the added thermal energy that causes grain growth to occur in the microstructure. Scanning strategies in accordance with the disclosed embodiments may be used to identify known microstructures and produce parts with predictable mechanical performance.

By achieving site-specific microstructure analysis, the methods and systems disclosed herein provide unprecedented control over part failure and performance. Specifically, by controlling thermal energy, crack initiation can be prolonged by increasing thermal energy, resulting in predictable microstructural changes leading to improved mechanical properties. Additionally, microstructural, gradients can be implemented to improve performance by selectively coarsening grains to delay crack initiation while grain refinement can be used to slow crack propagation rate. Control mechanisms are necessary to assess and prevent warping due to overheating and other detrimental defects.

In other embodiments, intentional spatial microstructural gradients can be achieved through the electron beam melting additive manufacturing (EBMAM) process by spatially controlling thermal energy input. The microstructural variations achieved can be used to control mechanical properties to selectively strengthen or weaken desired locations within an AM fabricated part. Spatial property tailoring can be used in damage tolerance design and allow controlled failure of components. Other embodiments disclosed herein have shown that tailoring material in a high stress region will improve fatigue life. In this embodiment, similar techniques can be used to create millimeter scale microstructural gradients in multiple design variations. The embodiments can provide gradients that can be used to specify crack propagation to traverse the most material during load controlled low cycle fatigue and failure. Microstructural analysis confirms the formation of graded regions within the fabricated parts.

Functionally graded materials (FGM) can be used to improve compatibility in dissimilar materials or add functionality to a given component. FGMs, as disclosed herein, can be used in numerous applications. Such applications include, but are not limited to aerospace—because of their ability to withstand large thermal gradients, medical applications—for improved biocompatibility by mimicking mechanical performance of tissue, and others including optoelectronic applications, protective coatings, sensors, and nuclear reactor components. Additive manufacturing (AM) can be used for the fabrication of several types of FGMs exploiting different aspects of the AM process. This allows for the creation of functionally graded powder melting (e.g., Ti-6Al-4V) fabrication through electron beam melting additive manufacturing (EBMAM) with a resulting improvement of fatigue performance and control over fatigue failure. Thermal energy control allotted by the EBMAM process allows microstructural tailoring in regions millimeters in scale, creating a FGM.

In one exemplary embodiment, an ARCAM A2 or similar manufacturing device, configured for 50 um layers of Ti-6Al-4V can be used for fabrication. Localized tailoring of the EBM fabricated Ti-6Al-4V can be achieved through the control of thermal energy applied during the EBM process. Additional melt scans can be added to the manufacturing process to increase energy input in order to tailor microstructure in a localized region. This can be achieved by creating an additional. CAD model of the desired tailored region that is used by the EBM system to re-melt the specified region. Design variations of the part can be created to demonstrate sections of tailored microstructure within the bulk part. During fabrication, the sections which require specially tailored microstructures are re-melted which creates a heat affected zone wherein alpha lath size increase. The remelted sections re-solidify forming fine alpha laths that are finer than the remaining bulk microstructure of the part.

Creation of functional microstructural gradients on a centimeter and millimeter scale in bulk parts as described above creates an additional degree of design freedom. For example, in certain embodiments, the methods and systems provide means for controlling failure in aerospace parts which allows designers to designate failure regions and optimize structures with no detriment to the structural integrity, service life, or damage tolerance. Functional gradients differ from previous work with AM technology by requiring no composition or geometric alteration; all the changes are realized through the microstructural tailoring (i.e., porosity, dislocation, and precipitates).

In certain embodiments, changes in microstructure can be created when additional heat is input during the EGM fabrication process. Optical microscopy can be used as a means to analyze and evaluate the localized microstructural changes in tailored regions that are subjected to multiple melt cycles.

Control of thermal energy input during the EBMAM process can thus be used to tailor part's microstructure, creating a functional gradient and controlling failure. The end microstructural changes are dependent on the area of the tailored region per layer and re-solidification.

Microstructural gradients are clearly evident in parts created according to the methods and systems disclosed herein. Defect structure (i.e., porosity and dislocations) analysis can be done in order to understand and exploit the effects of microstructural tailoring. Formation of millimeter scale microstructural gradients allow for precise mechanical performance optimization and longer service life of structural dynamically loaded components (e.g., aerospace components). In certain embodiments, fracture pathways of parts can thus be anticipated and can be directed toward crack impeding features such as a circular hole or a facilitator of a self-healing device.

Based on the foregoing, it can be appreciated that a number of embodiments, preferred and alternative, are disclosed herein. For example, in one embodiment, a method comprises designing a part, evaluating material performance in the part, developing a treatment cycle, and implementing the treatment cycle during an additive manufacturing of the part in order to improve performance of the part.

In an embodiment, evaluating performance in the part comprises modeling the part electronically, analytically, or intuitively and evaluating the model to identify performance limitations in the part. The performance limitations can comprise at least one of high stress areas, high temperature areas, or points of failure.

In an embodiment, developing a treatment cycle comprises evaluating the performance limitations and setting a series of treatment steps for addressing the limitations. In an embodiment, the treatment cycle comprises selectively subjecting the part to thermal variation comprising at least one melt cycle. In an embodiment, selectively subjecting the part to thermal variation further comprises changing at least one characteristic of the part, the characteristics comprising porosity, chemistry, precipitate volume fraction, phase volume fraction, carbide size, carbide geometry, and grain size.

In an embodiment, the manufacturing comprises of at least one of additive manufacturing technologies, powder bed fusion, binder jetting, and directed energy deposition.

In another embodiment, a method for manufacturing parts with precipitate rich regions comprises establishing an inert environment in a build chamber of a 3D printing machine, melting powder in the build chamber to form a layer of the part, reducing a process temperature, altering gas pressure, re-melting a specified region, and repeating each of the steps for each layer of the part until the part is completed. The method can further comprise initializing the machine to create precipitate rich regions in the part. In an embodiment, the precipitates are comprised of at least one of carbides, nitrides, and oxides.

In an embodiment, altering gas pressure further comprises increasing a partial pressure of at least one of the following argon, oxygen, nitrogen, carbon monoxide, and carbon dioxide. In an embodiment, re-melting the specified region forms precipitates in the region. In an embodiment, the specified region comprises a region of the part identified as a critical region of the part.

In another embodiment, reducing the processing temperature further comprises delaying the processing until the processing temperature reaches a desired level.

In an embodiment, the 3D printing machine comprises one of a powder bed fusion machine and a directed energy deposition additive manufacturing 3D printing machine.

In another embodiment, a method for manufacturing parts with tailored properties comprises: melting powder in the build chamber to form a layer of the part, re-melting a specified region, and repeating each of the steps for each layer of the part until the part is completed.

In an embodiment, re-melting the specified region further comprises altering at least one microstructural characteristic of the part, the microstructural characteristics comprising at least one of porosity, grain size, and chemical composition in the region.

In an embodiment, manufacturing comprises at least one of powderbed fusion and directed energy deposition additive manufacturing machines.

In another embodiment, a method for manufacturing composite parts with graded compositions comprises creating CAD models of at least one part containing porosity, setting up a manufacturing machine, removing powder within at least one intended porous regions, curing, sintering, and/or heat treating the part, preparing secondary material in liquid form, infiltrating a 3D object with liquid material, and post-processing the part. The manufacturing comprises binder jetting additive manufacturing.

The techniques/embodiments described herein are in no way meant to limit the breadth of potential applications. It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

What is claimed is:

1. A method for manufacturing parts with precipitate rich regions, said method comprising:
    establishing an inert environment in a build chamber of a 3D printing machine;
    melting powder in said build chamber to form a layer of said part;
    delaying for a specified time period to reduce a processing temperature;
    following the delay, altering a partial pressure of a select gas;
    re-melting a specified region at a prescribed temperature and for a prescribed time to form precipitates in the specified region that selectively strengthen the specified region; and
    repeating each of said steps for additional layers of the part.

2. The method of claim 1 further comprising:
    initializing said manufacturing to create precipitate rich regions in said part.

3. The method of claim 2 wherein precipitates in said precipitate rich regions of said part are comprised of at least one of:
    carbides;
    nitrides; and
    oxides.

4. The method of claim 1 wherein altering the partial pressure of the select gas further comprises:
    increasing a partial pressure of at least one of:
    argon;
    oxygen;
    nitrogen;
    carbon monoxide; and
    carbon dioxide.

5. The method of claim 1 wherein re-melting said specified region forms carbide precipitates in said region.

6. The method of claim 5 wherein said specified region comprises a region of said part identified as a critical region of said part.

7. The method of claim 1 wherein said 3D printing machine comprises one of:
    a powder bed fusion machine; and
    a directed energy deposition additive manufacturing 3D printing machine.

8. The method of claim 1 wherein re-melting said specified region further comprises:
    altering at least one microstructural characteristic of said part, said microstructural characteristics comprising at least one of:
    porosity;
    grain size; or
    chemical composition in said region.

9. The method of claim 1, wherein said steps are performed for all layers of the part.

10. The method of claim 1, wherein said steps are performed for a subset of layers of the part.

11. A method of additive manufacturing a part, the method comprising:
    establishing an inert environment in a build chamber of an additive manufacturing machine containing an alloy powder;
    preheating the build chamber to a specified operating temperature;
    melting a layer of the alloy powder with a directed energy beam to create a solid form;

delaying for a specified time period to allow the build chamber to return to the specified operating temperature;

following the delay, increasing a partial pressure of a selected gas in the build chamber; and re-melting a specified region of the solid form to create precipitates that selectively strengthen the specified region.

12. The method of claim 11, further comprising performing a second preheat of the build chamber.

13. The method of claim 11, further comprising delaying a second time to reduce temperature in the build chamber.

14. The method of claim 11, wherein the specified region is a predicted area of crack initiation and crack propagation in the part.

15. The method of claim 11, wherein re-melting creates a microstructural gradient by facilitating grain growth.

16. The method of claim 11, wherein the selected gas is one of:
   argon;
   oxygen;
   nitrogen;
   carbon monoxide; or
   carbon dioxide.

17. The method of claim 11, wherein the directed energy beam is an electron beam.

18. A method of creating intentional microstructural gradients during electron beam melting additive manufacturing of a part, the method comprising:

creating a design for the part;

simulating a stress behavior of the part based on the design;

predicting areas of crack initiation and propagation in the part based on the simulated stress behavior;

establishing an inert environment in a build chamber of an additive manufacturing machine containing an alloy powder;

preheating the build chamber to a specified operating temperature;

performing a first melt scan of a first layer of the alloy powder with an electron beam to create a solid form;

delaying for a specified time period to allow the build chamber to return to the specified operating temperature;

following the delay, increasing a partial pressure of CO or $CO_2$ in the build chamber; and performing a second melt scan of at least one specified region of the solid form to create carbide precipitates in the specified region, wherein the specified region is predicted to be in an area of crack initiation and propagation, and wherein the carbide precipitates selectively strengthen the specified area.

19. The method of claim 18, wherein said steps are performed for all layers of the part.

20. The method of claim 18, wherein said steps are performed for a subset of layers of the part.

* * * * *